W. F. FOLMER.
PHOTOGRAPHIC CAMERA.
APPLICATION FILED SEPT. 14, 1910.
1,023,932.
Patented Apr. 23, 1912.
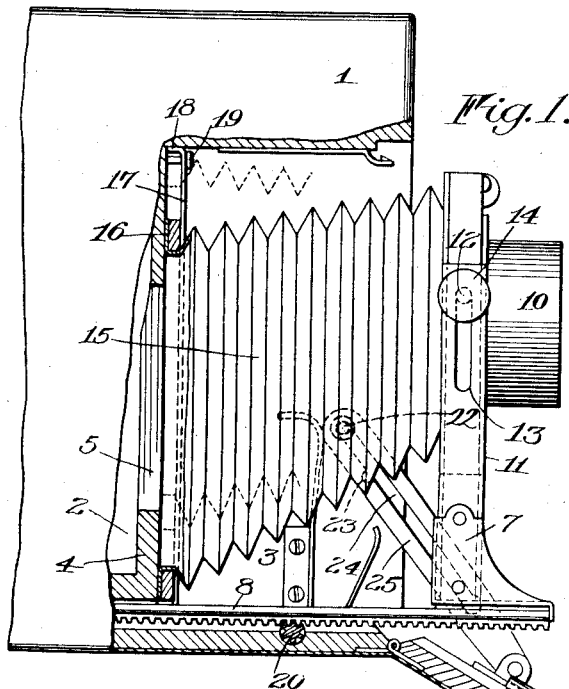
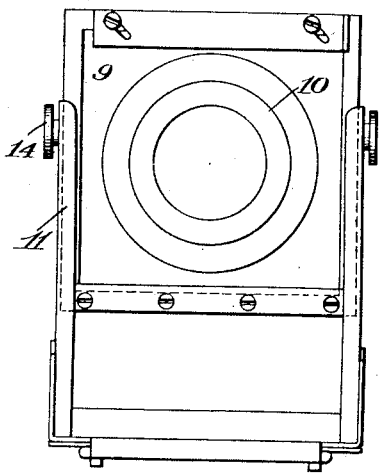
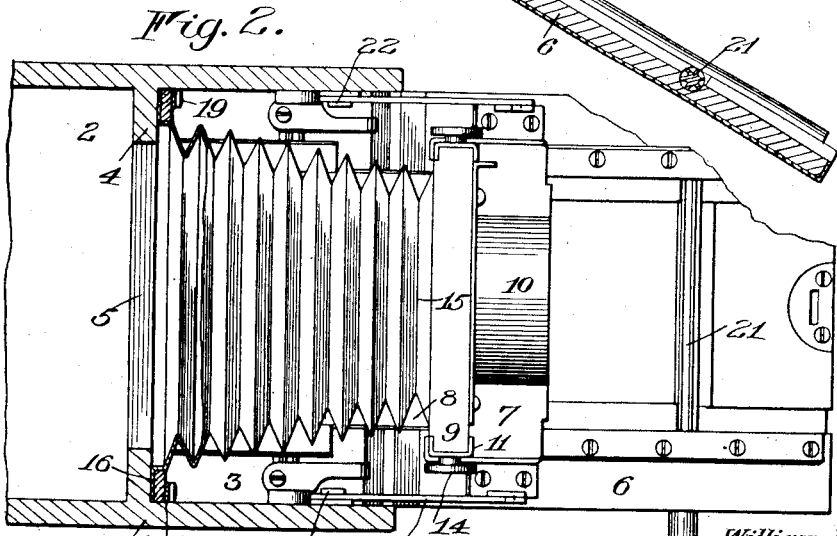
Witnesses
Walter B. Payne.
Russell B. Griffith
Inventor
William F. Folmer
By Church & Rich
his Attorneys

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

PHOTOGRAPHIC CAMERA.

1,023,932.        Specification of Letters Patent.        Patented Apr. 23, 1912.

Application filed September 14, 1910. Serial No. 581,986.

*To all whom it may concern:*

Be it known that I, WILLIAM F. FOLMER, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide such improvements in these devices, when their structure comprises a bellows, as to insure the regularity and compactness of the latter when it and the front to which it is attached are moved to folded position.

A further object of the invention is to make arrangements whereby, with a rising and falling front, the bellows is permitted to automatically adjust itself so as not to be caught in a cramped or distorted position during compression with the retraction of the front no matter in what position of adjustment the latter is left.

To these and other ends the invention consists in certain improvements and combinations of parts all as will be hereinafter more fully described, the novel features being pointed out in the claims at the end of the specification.

In the drawings: Figure 1 is a side elevation, partly in longitudinal vertical section, of a camera constructed in accordance with and illustrating one embodiment of my invention; Fig. 2 is a top plan view thereof in horizontal section through the camera box or body, and Fig. 3 is an elevation of the camera front.

Similar reference numerals throughout the several figures indicate the same parts.

The camera of the present embodiment is of the folding type comprising a box or body 1 having an exposure chamber 2 and a forwardly arranged storage chamber 3 separated from chamber 2 by a partition 4 provided with an exposure opening 5. The storage chamber 3 and the open front of the box is adapted to be closed by a hinged door 6 which also serves, together with the bottom of the chamber 3, as the camera bed and along which the lens carriage 7 is projected on a suitably operated extension device 8. These devices, however, will not be described in detail as they form no part of the present invention. A rising and falling front 9, carrying the lens tube 10, is guided for vertical movement in the flanged lateral standards 11 of the carriage while pins 12 thereon operate in slots 13 in the standards and carry thumb screws 14 which, when tightened against the latter, clamp the front in different desired positions of vertical adjustment for purposes well known in the art. The bellows 15 is suitably connected to the front 9 at its forward end while its rear end is reinforced by a frame 16 to which it is connected and which surrounds the exposure opening 5.

With the parts in the position of Fig. 1 the carriage and front have been partially extended and the latter adjusted to an extreme raised position so that the bellows 15 extends in an angular position with respect to the bottom of chamber 3 from end to end. In such a situation, with the ordinary camera, it would be necessary, in order to push the front and carriage back into the storage chamber 3, provided for their accommodation, to first drop the front 9 so that the ends of the bellows would be in alinement as to the direction of movement and the bellows would be evenly compressed without distortion. Frequently, however, the operator omits to take this precaution and crowds the front into the chamber with the bellows awry or else he is forced to drop the front in order to temporarily fold the camera, even though his next exposure will necessitate the same adjustment of the front. In order, therefore, that the bellows may be properly compressed in whatever position of adjustment the front may be, I first construct the storage chamber 3 sufficient in height to accommodate the front 9 when in its extreme elevated position, as shown in Fig. 1, and secondly I provide guides in which the rear end of the bellows is loosely mounted and freely movable in a vertical direction or one parallel to the rising and falling movements of the front. These guides, in the present instance, comprise straps 17 at opposite sides of the exposure opening 5 that are spaced from the partition 4 by their rearwardly turned ends 18 and held to the partition by fasteners 19. Between these straps and the partition, the edges of the reinforcing frame 16 for the rear end of the bellows is freely movable with the result that when the front is moved rearwardly within the chamber 3 from the full line position of Fig. 1 the bellows, stiffening against lateral distortion in direct proportion to the degree of its compression, stiffens and straightens out and its front end being fixed, its rear end, together with the frame 16, is raised in the guides 17 to approximately the dotted line position of Fig. 1. After the front has been extended again to a sufficient degree, the rear end of the bellows and its reinforcing frame 16 drops to its first position again of its own weight. Of course, if the camera is being used with the front 9 in its lowermost position the above described functions are not resorted to, the frame 16 maintaining its full line position as though fixed to the camera body. While the frame should travel loosely in the guides care must be exercised that it still fits sufficiently snug to prevent entrance of light at this point.

In order to give a brief understanding of the camera of the present embodiment with respect to the parts shown but having no intimate relation with this invention I would say that the extensible element 8 on which the carriage 7 is projected is operated initially by a pinion 20 on the body and for further projection engages with a similar pinion 21 on the bed 6 in which latter case the bed is supported in a horizontal position by the stop 22 on the body engaging with an abutment 23 at the side of the slot 24 in each of the links 25. The bed 6 is dropped, as shown in the drawings, when a short focus or wide angle lens is being used in which case the front is only partially projected and the stop 22 is at the end of the slot 24.

I claim as my invention.

1. In a camera, the combination with a camera box or body and a rising and falling front movable toward and from the body, of vertical guides on the body, a frame movable in the guides parallel with the rising and falling movements of the front, and a bellows connected to the latter at its forward end and having its rear end connected to the frame.

2. In a camera, the combination with a camera box or body and a front movable toward and from the same, of guides on the body extending parallel with the front, and a bellows connected at its forward end to the front and having its rear end loosely mounted and freely movable in the guides.

3. In a camera, the combination with a camera box or body and a front movable toward and from the same, of guides on the body, a frame freely movable in the guides parallel with the front, and a bellows connected to the latter and to the frame.

4. In a camera, the combination with a box or body and a rising and falling front movable toward and from the same, of guides on the body, and a bellows having one end connected to the front and the other freely movable in the guides in a direction parallel with the rising and falling movements of the front.

5. In a camera, the combination with a box or body having an exposure opening therein and a storage chamber arranged forwardly of the opening and a front movable toward and from the body and adapted to assume a position within the storage chamber, of guides arranged within the body at opposite sides of the exposure opening and extending transversely of the path of the front during the aforesaid movement of the latter and a bellows having one end connected to the front and the other freely movable in the guides to surround the exposure opening.

6. In a camera, the combination with a box or body having an exposure opening therein and a storage chamber arranged forwardly of the opening and a rising and falling front movable toward and from the body and adapted to assume a position within the storage chamber, of guides arranged within the body at the sides of the exposure opening, a frame surrounding the exposure opening freely movable in the guides parallel with the rising and falling movements of the front, and a bellows having one end connected to the front and the other end to the frame.

WILLIAM F. FOLMER.

Witnesses:
  RUSSELL B. GRIFFITH,
  NELSON COPP.

---

Copies of this patent may be obtained for five cents each, by addressing the "Commissioner of Patents, Washington, D. C."